United States Patent
Evslin

(10) Patent No.: US 9,491,303 B2
(45) Date of Patent: *Nov. 8, 2016

(54) CALL SETUP USING VOICE OVER THE INTERNET PROTOCOL (VOIP)

(71) Applicant: ITXC IP Holdings S.a.r.l., Luxembourg (LU)

(72) Inventor: Tom Evslin, Stowe, VT (US)

(73) Assignee: ITXC IP Holdings S.a.r.l., Luxembourg (LU)

( * ) Notice: Subject to any disclaimer, the term of this patent is extended or adjusted under 35 U.S.C. 154(b) by 133 days.

This patent is subject to a terminal disclaimer.

(21) Appl. No.: 14/286,009

(22) Filed: May 23, 2014

(65) Prior Publication Data

US 2014/0254586 A1    Sep. 11, 2014

Related U.S. Application Data

(63) Continuation of application No. 10/677,054, filed on Oct. 1, 2003, now Pat. No. 8,750,289.

(51) Int. Cl.
| | |
|---|---|
| *H04L 12/66* | (2006.01) |
| *H04M 11/00* | (2006.01) |
| *H04M 7/00* | (2006.01) |

(Continued)

(52) U.S. Cl.
CPC .......... *H04M 7/006* (2013.01); *H04L 12/6418* (2013.01); *H04L 29/06027* (2013.01); *H04L 65/103* (2013.01); *H04L 65/104* (2013.01); *H04L 65/1009* (2013.01); *H04L 65/1069* (2013.01); *H04M 7/1245* (2013.01); *H04M 7/1265* (2013.01); *H04Q 3/66* (2013.01); *H04Q 11/0457* (2013.01); *H04L 2012/6486* (2013.01); *H04Q 2213/13034* (2013.01); *H04Q 2213/13164* (2013.01); *H04Q 2213/13166* (2013.01); *H04Q 2213/13176* (2013.01); *H04Q 2213/13178* (2013.01); *H04Q 2213/13196* (2013.01);

(Continued)

(58) Field of Classification Search
CPC .......... H04L 65/1069; H04L 65/1006; H04L 5/1438; H04L 29/06; H04L 69/24; H04M 7/006; H04M 11/06; H04M 11/066
USPC ....................................... 370/352; 379/93.32
See application file for complete search history.

(56) References Cited

U.S. PATENT DOCUMENTS

| | | |
|---|---|---|
| 6,141,322 A | 10/2000 | Poretsky |
| 6,600,735 B1 | 7/2003 | Iwama et al. |

(Continued)

OTHER PUBLICATIONS

"Parent U.S. Appl. No. 10/677,054", "NonFinal Office Action", Apr. 14, 2009, Publisher: USPTO, Published in: US.

(Continued)

*Primary Examiner* — Rasha Al Aubaidi
(74) *Attorney, Agent, or Firm* — Kaplan Breyer Schwarz & Ottesen, LLP

(57) ABSTRACT

A method of performing call setup in a system comprises an origination telephony network, a termination telephony network and a packet switched data network interconnecting therebetween comprises steps of implementing call setup across the two telephony networks by SS7 protocol and implementing call setup within the packet switched data network by H.323 protocol. In particular, the call setup in the data network is not started until information of the resources status in the termination telephony network is available. A novel gateway is provided to implement the method, which comprises both SS7 capabilities and H.323 functionalities.

14 Claims, 2 Drawing Sheets

(51) Int. Cl.
*H04L 12/64* (2006.01)
*H04L 29/06* (2006.01)
*H04M 7/12* (2006.01)
*H04Q 3/66* (2006.01)
*H04Q 11/04* (2006.01)

(52) U.S. Cl.
CPC .............. *H04Q2213/13204* (2013.01); *H04Q 2213/13383* (2013.01); *H04Q 2213/13389* (2013.01)

(56) References Cited

U.S. PATENT DOCUMENTS

| | | |
|---|---|---|
| 6,614,781 B1 | 9/2003 | Elliott et al. |
| 6,636,596 B1 * | 10/2003 | Gallant .................. H04L 29/06 370/389 |
| 2002/0141386 A1 * | 10/2002 | Minert .................... H04L 12/66 370/352 |

OTHER PUBLICATIONS

"Parent U.S. Appl. No. 10/677,054", "NonFinal Office Action", Oct. 17, 2008, Publisher: USPTO, Published in: US.

"Parent U.S. Appl. No. 10/677,054", "NonFinal Office Action", Jan. 9, 2008, Publisher: USPTO, Published in: US.

"Parent U.S. Appl. No. 10/677,054", "NonFinal Office Action", Nov. 30, 2009, Publisher: USPTO, Published in: US.

"Parent U.S. Appl. No. 10/677,054", "NonFinal Office Action", Dec. 2, 2010, Publisher: USPTO, Published in: US.

"Parent U.S. Appl. No. 10/677,054", "Final Office Action", Jun. 21, 2011, Publisher: USPTO, Published in: US.

"Parent U.S. Appl. No. 10/677,054", "Final Office Action", Jun. 22, 2010, Publisher: USPTO, Publised in: US.

* cited by examiner

CALL SETUP USING VOICE OVER THE INTERNET PROTOCOL (VOIP)

CROSS-REFERENCE TO RELATED APPLICATION(S)

This application is a continuation of application Ser. No. 10/677,054, filed Oct. 1, 2003. The entirety of the foregoing application is hereby incorporated herein by reference.

TECHNICAL FIELD OF THE INVENTION

The present invention relates to VoIP (Voice over Internet Protocol) technology, and in particular, to a method and apparatus for performing call setup over a system comprising both a telephony network and a packet switched data network.

BACKGROUND OF THE INVENTION

Out of band signaling systems are vastly utilized for telephony setup. The out of band signaling is separated from the channel carrying the information. Thus, the signaling and control information does not intrude upon the media channel. SS7 (Signaling System 7) is a typical out of band signaling protocol utilized for telephony networks in North America. C7 is a protocol in Europe, equivalent loosely to SS7.

Due to the rapid development of Internet technologies, voice communications via the Internet using Voice over Internet Protocol (VoIP) has become a practical and cost-saving solution instead of, or in combination with, traditional telephony networks. H.323 is a standard widely accepted for implementing voice communications (and other real-time multimedia communications) over a packet switched data network (such as the Internet). H.323 governs allocation of call resources, call tear down, management of gateway resources, and other functions required on the packet switched data network.

A typical combination of a telephony network and a packet switched data network is a system shown in FIG. 1, which implements phone-to-phone calls. Different from traditional telephony systems, the system shown in FIG. 1 comprises three network legs. Both the origination and termination legs are traditional telephony networks (such as PSTN) while the middle leg is Internet bridging between the origination and termination legs. In the origination leg, a call is initiated by a calling device or telephone 110 and transmitted to an origination gateway 116 of IP network 107 through switches 112 and 114 of the PSTN network 103. In the middle leg, the call is transmitted from the origination gateway 116 to termination gateway 118 over IP network 107 according to the VoIP protocol. In the termination leg, the call is finally transferred from the termination gateway 118 through the switches 124 and 128 of PSTN network 105 to the called device or telephone 130. It can be appreciated that costs, especially for long distance calls and international calls, can be dramatically decreased because the two PSTNs are interconnected by the Internet.

However, a drawback exists in the call setup process in such a combination system. As shown in FIG. 1, first an out of band signaling (e.g., SS7) takes place on the origination leg. Then, H.323 signaling takes place in the middle leg, allocating the use of resources in the IP network, and transmitting the call setup information to the termination leg. Finally, SS7 signaling takes place in the terminal leg. Therefore, the H.323 signaling and resource utilization will always take place regardless of the SS7 information known on the termination side. So, for example, if a termination switch does not have resources to complete the phone call, the VoIP network will still use resources all along the call path to setup the call, and then use resources to tear down the call once it finds out that the termination switch cannot take the call. Therefore, the resources in the VoIP network are wasted if the call setup is not successful in the termination leg.

Therefore, there exists a need for a call setup method in which the H.323 call setup does not start if the termination leg cannot take the call.

Additionally, the SS7 signaling is usually faster than the H.323 signaling. Therefore the use of H.323 signaling adds to call setup time. Thus, there also exists a need in the art for a system that can execute the SS7 call setup faster than in present day art, without having to experience delays associated with traversing the IP network and execution the H.323 protocol.

SUMMARY OF THE INVENTION

The present invention provides a method of performing call setup for a call in a system comprising a packet switched data network bridging between an origination telephony network and a termination telephony network. The method comprises the steps of implementing call setup across the two telephony networks with an out of band telephony signaling protocol and implementing call setup within the packet switched data network with a separate signaling protocol. In particular, the call setup within the packet switched data network is implemented after the information on the status of the resources in the termination telephony network is available. Thus, no call setup will be performed in the packet switched data network and therefore no resources in the packet switched data network will be wasted if the termination telephony network cannot take the call. Preferably, the out of band signaling protocol is Signaling System 7 (SS7) protocol, while the separate signaling protocol within the packet switched data network is the H.323 protocol.

Preferably, an Initial Address Message (IAM) is sent from an origination point signaling controller to a termination point signal controller through an SS7 network, and, in response, an Answer Complete Message (ACM) is sent from the termination point signal controller to the origination point signaling controller, confirming that the termination telephony network can take the call. Preferably, the H.323 setup signaling is delayed until an origination gateway receives a message from the origination point, confirming that the ACM is received. Preferably, the signaling controllers physically are respective gateways themselves.

To implement the above method, the present invention further provides a gateway that includes capabilities of implementing SS7 signaling in addition to its H.323 capabilities. In particular, the gateway comprises a first interface for receiving out of band telephone setup signals from a telephony network, and a second interface for transmitting the out of band setup signals to another gateway over a packet switched data network. Preferably, the gateway includes software to determine whether another gateway has SS7 signaling capabilities and to select whether to communicate call setup messages with the other gateway via the SS7 protocol or the H.323 protocol. A gatekeeper may also be used to supply capabilities of remote gateway or select a gateway with the right capabilities.

BRIEF DESCRIPTION OF THE DRAWINGS

The above and other features and advantages of the present invention will be clearer after reading the detailed description of the preferred embodiments of the present invention, with reference to the accompanying drawings in which.

DETAILED DESCRIPTION

The method of performing call setup according to the present invention is now described in detail with reference to FIG. 2.

The setup in the origination leg is performed with an out of band signaling system such as SS7. The originating switch 112, which connects the telephone device 110 to a telephony network such as a PSTN, sends the IAM (Initial Address Message) to a signaling controller (SC) 115 of an origination gateway (oGW) 116. Call setup takes place between the originating switch 112 and the oGW 116.

Figure 1:
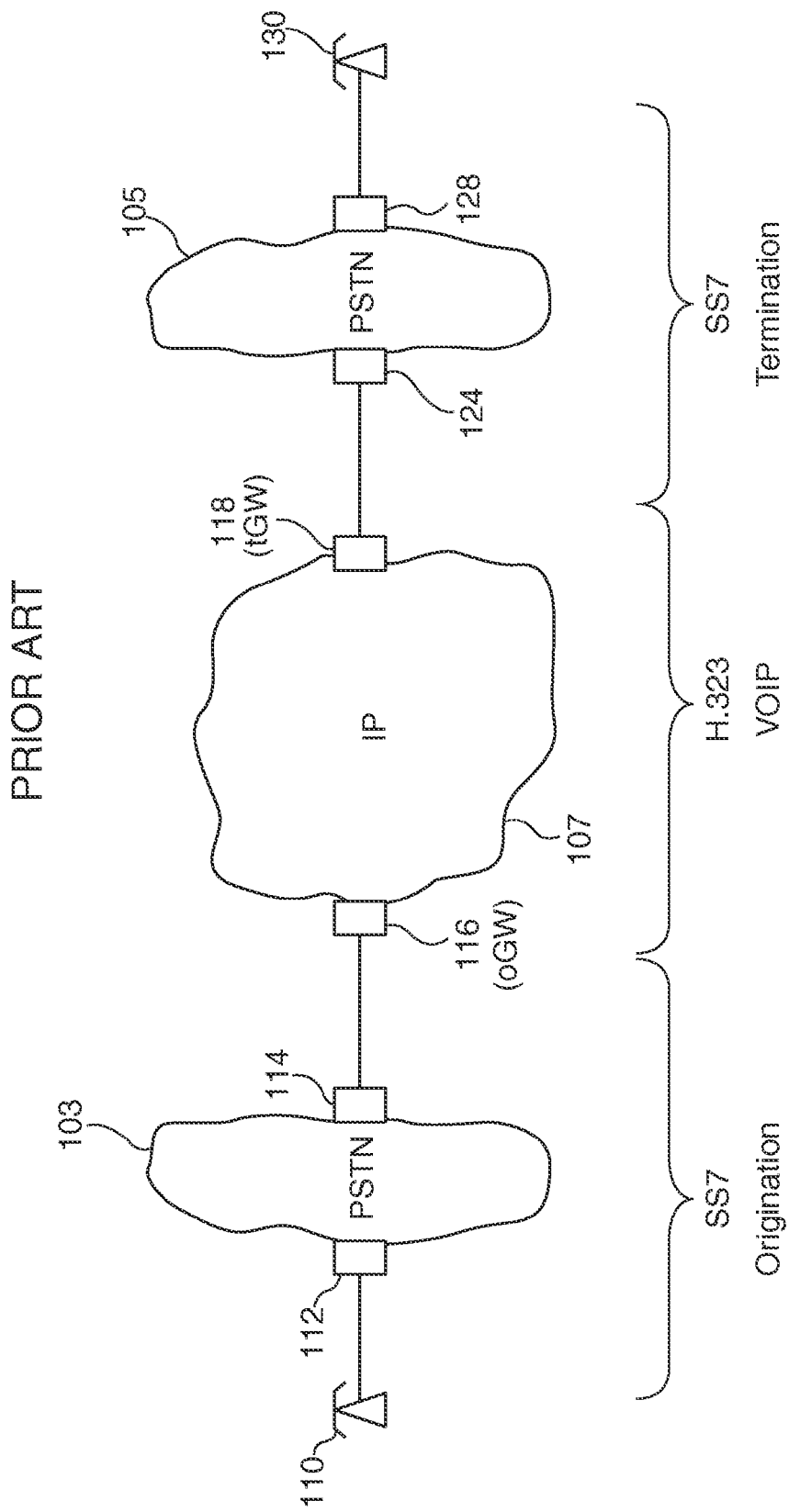
FIG. 1 illustrates a prior art call setup signaling in a combination system of two telephony networks interconnected by a packet switched data network.
Figure 2:
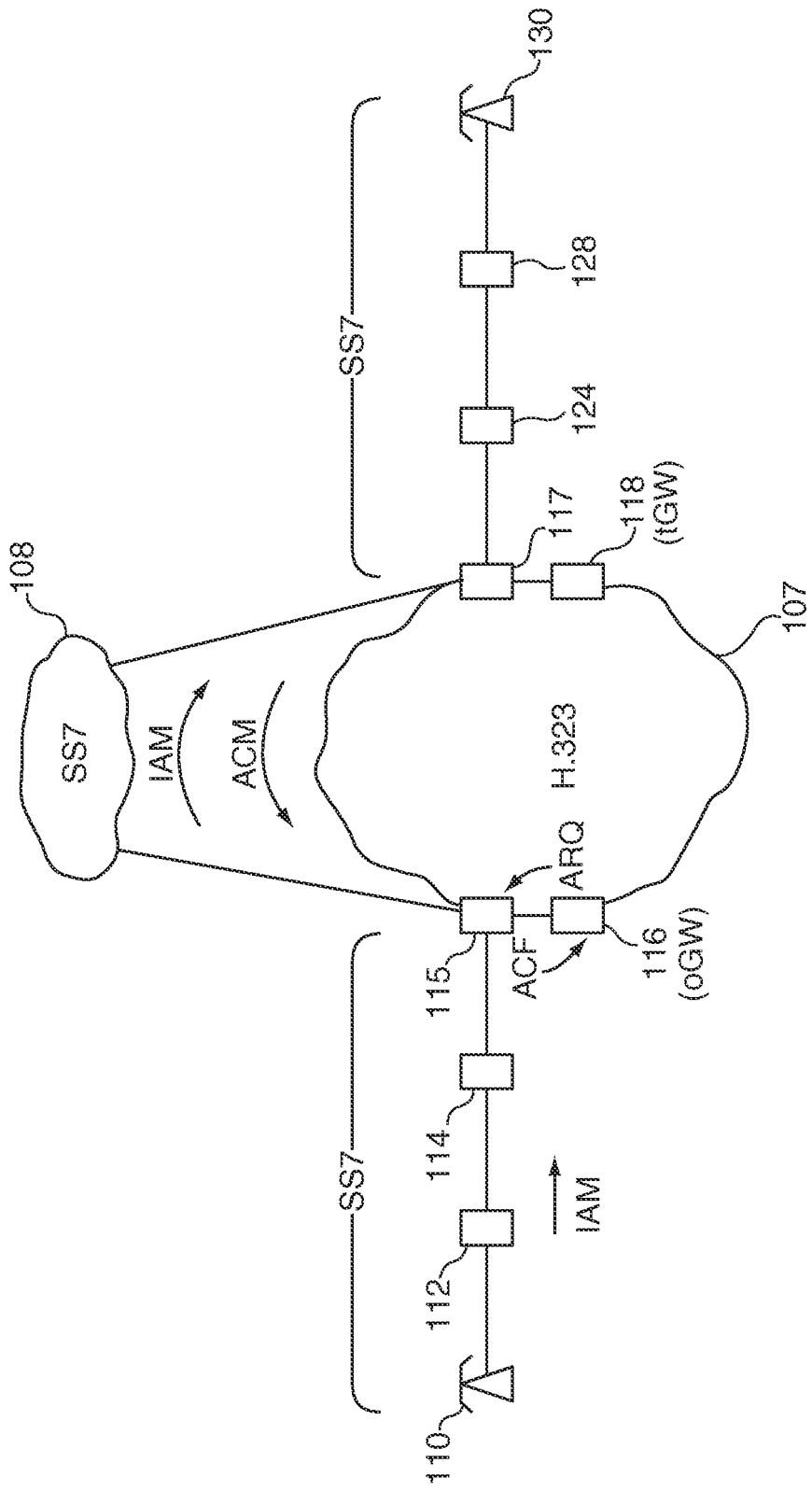
FIG. 2 illustrates the inventive call setup signaling method according to the present invention.

It is understood that although the signaling controller (SC) 115 is shown as a separate element from the oGW in FIG. 2, it can also physically be the oGW itself, or a gatekeeper, a softswitch type device, or an STP (Signaling Transfer Point) type device. Therefore, SC 115 (as well as SC 117 of the termination gateway 118) should be understood as to its functionality of managing call signaling, but not to any set physical device.

The IAM includes information about the call such as dialing phone number, dialed phone number, etc. Upon receipt of the IAM, the origination point SC 115 (or a call routing engine) determines call routing options, including destinations (e.g., the IP address of termination gateway tGW 118) for the signaling and the media. In some implementations, SC 115 and the routing engine can work together to determine the routing options.

Using the H.323 protocol, the oGW 115 sends an ARQ (AnswerReQuest) message to the origination point SC 115, asking for the destination IP address to which the call shall be routed. Here it is to be understood that the ARQ message represents both ARQ (e.g., if SC 115 is a gatekeeper) and ARQ equivalent (e.g., if SC 115 is an STP type device). In response to the ARQ, the origination point SC 115 sends ACF (AnswerConFirm) message to oGW 116, giving the destination IP address of the termination gateway (tGW) 118 to route the call to.

Importantly, in addition to the ACF, the origination point SC 115 also sends an indicator to oGW 116, informing oGW 116 that the call is headed to an SS7 network. Thus, different from the prior art where the origination gateway simply goes forward to start H.323 signaling to setup the VoIP communication over the packet switched data network (such as Internet) 107, in the present invention oGW 116 recognizes the indicator and therefore holds the ACF, waiting for a confirmation from the SS7 network before starting H.323 call setup with the termination gateway (tGW) 118, as will be explained in detail below.

According to the present invention, the origination point SC 115 also sends the IAM to a termination point SC 117 of termination gateway (tGW) 118 through a SS7 network 108. Upon receipt of the IAM, the termination point SC 117 determines that it serves the called number and that the called number is idle. Then, the termination point SC 117 sends an Answer Complete Message (ACM) to the origination point SC 115 with SS7 protocol, confirming that the resources in the termination leg are available and able to take the call.

The termination point SC 117 also rings the line of the called party 130, sends ringing back to oGW 116 through tGW 118. tGW 118 reserves capacity for any additional call signaling (e.g., H.323 call signaling) that it will receive from oGW 116, and waits to send the ringing until it completes additional (if necessary) signaling transactions with the oGW 116.

The method may also be implemented so that several requests are sent in parallel to find a route as quickly as possible After receiving the ACM from the termination point SC 117 over the SS7 network 108, the origination point SC 115 alerts the oGW 116 that has been holding the ACF. Upon receipt of the alert from the origination point SC 115, oGW 116 starts H.323 call setup signaling with tGW 118, whereby establishes the VoIP virtual circuit between oGW 116 and tGW 118, and the ringing is cut through to the caller.

Therefore, the H.323 call setup signaling does not take place until oGW 116 receives the alert from the origination point SC 115 which represents a confirmation of the resource availability in the termination leg. In other words, there will be no H.323 setup signaling and therefore no resource utilization in the VoIP network if the termination leg can not take the call.

Preferably, if the termination point SC 117 cannot take the call, then a disconnection or release is sent to the origination point SC 115. SC 115 will try another termination endpoint, depending on the release cause it receives from SC 117. Thus, the VoIP network could route the call to a different termination switch.

To implement the method of the present invention, the originating point SC 115 is able to communicate call setup messages with the termination point SC 117 over SS7 network 108.

Preferably, originating point SC 115 physically is the oGW 116 itself. Thus, according to the present invention, in addition to its H.323 functionalities over VoIP network, oGW 116 further has SS7 infrastructure to implement SS7 capabilities. In particular, oGW 116 comprises two interfaces. The first interface receives SS7 signals from the origination telephony network, and the second interface transmits the SS7 signals to the termination point SC 117 or the tGW 118 if SC 117 physically is the tGW 118 itself.

Preferably, oGW 116 further comprises a software application to determine whether the termination point SC 117 or tGW 118 has SS7 capabilities, and to determine whether to communicate with the SC 117 or tGW 118 through SS7 network 108 or by H.323 protocol via the packet switched data network 107.

Though the above has described preferred embodiments of the present invention, it is understood that numerous variations, modifications and adaptations are possible to a skilled person in the art without departing the spirit of the invention. For example, the out of band signaling system may be C7 instead of SS7, and H.323 may be replaced by SIP. The SS7 signalling itself may be over an IP network. Therefore, the scope of the present invention is intended to be solely defined in the accompanying claims.

What is claimed is:

1. A method of performing call setup through a packet switched data network for a call originated at a first telephony network toward a second telephony network, the packet switched data network connecting the first telephony network to the second telephony network, the method comprising:
sending, by an originating gateway of the packet switched data network, an H.323 protocol-based Admission_Request (ARQ) to an origination point signaling controller;
receiving, by the originating gateway and in response to the sending of the ARQ, an H.323 protocol-based Admission_Confirmation (ACF) from the origination point signaling controller;
receiving, by the originating gateway, an indicator from the origination point signaling controller;
in response to receiving the indicator, holding the ACF at the originating gateway such that a holding occurs of the call setup of the call through the packet switched data network, wherein the indicator indicates that the call is headed to an SS7 network, and wherein the holding of the ACF at the originating gateway is further based on the call being headed to the SS7 network; and
implementing the call setup for the call within the packet switched data network via an H.323 protocol, there being no communication path for the call through the packet switched data network prior thereto.

2. The method of claim 1 wherein the holding of the ACF at the originating gateway comprises waiting, by the originating gateway, for a confirmation that the setup in the second telephony network is successful before the implementing of the call setup within the packet switched data network via the H.323 protocol.

3. The method of claim 2 further comprising receiving, by the originating gateway, the confirmation from the origination point signaling controller, based on the origination point signaling controller receiving an Answer Complete Message (ACM) in accordance with an SS7 protocol.

4. The method of claim 3 wherein the implementing of the call setup for the call within the packet switched data network via the H.323 protocol is started upon the receiving of the confirmation by the originating gateway.

5. The method of claim 3 further comprising: receiving, by the origination point signaling controller, a release message from a first termination point signaling controller when the first termination point signaling controller cannot take the call; and upon the receiving of the release message, selecting, by the origination point signaling controller, a second termination point signaling controller.

6. The method of claim 1 further comprising determining, by the originating gateway, whether to transmit call setup messages to a termination point signaling controller in accordance with an out-of-band signaling protocol or in accordance with the H.323 protocol.

7. The method of claim 6 wherein the determining is based on whether the termination point signaling controller has SS7 capabilities.

8. The method of claim 1 wherein the first and second telephony networks are Public Switched Telephone Networks (PSTN).

9. The method of claim 1 wherein the H.323 protocol-based ARQ is one of multiple ARQs that are sent, by the originating gateway, in parallel with one another in order to find a route as quickly as possible.

10. A method of performing call setup through a packet switched data network for a call originated at a first telephony network toward a second telephony network, the packet switched data network connecting the first telephony network to the second telephony network, the method comprising:
sending, by an originating gateway of the packet switched data network, an H.323 protocol-based Admission_Request (ARQ) to an origination point signaling controller;
receiving, by the originating gateway and in response to the sending of the ARQ, an H.323 protocol-based Admission_Confirmation (ACF) from the origination point signaling controller;
determining, by the originating gateway, whether to transmit call setup messages to a termination point signaling controller of the packet switched data network, via an out-of-band signaling network or via the packet switched data network;
based on determining that the call setup messages are to be transmitted via the out-of-band signaling network, holding the ACF at the originating gateway such that a holding occurs of the call setup of the call through the packet switched data network, wherein the holding of the ACF at the originating gateway is further based on the call being headed to an SS7 network; and
implementing the call setup for the call within the packet switched data network via an H.323 protocol, there being no communication path for the call through the packet switched data network prior thereto.

11. The method of claim 10 wherein the determining is based on whether the termination point signaling controller has SS7 capabilities.

12. The method of claim 10 wherein the holding of the ACF at the originating gateway comprises waiting, by the originating gateway, for a confirmation that the setup in the second telephony network is successful before the implementing of the call setup within the packet switched data network via the H.323 protocol.

13. The method of claim 12 further comprising receiving, by the originating gateway, the confirmation from the origination point signaling controller, based on the origination point signaling controller receiving an Answer Complete Message (ACM) in accordance with an SS7 protocol.

14. A method of performing call setup through a packet switched data network for a call originated at a first telephony network toward a second telephony network, the packet switched data network connecting the first telephony network to the second telephony network, the method comprising:
sending, by an originating gateway of the packet switched data network, multiple H.323 protocol-based Admission Requests (ARQ) in parallel with one other;
receiving, by the originating gateway and in response to the sending of one of the multiple ARQs, a first-received H.323 protocol-based Admission_Confirmation (ACF) from an origination point signaling controller;
receiving, by the originating gateway, an indicator from the origination point signaling controller and corresponding to the first-received ACF;
in response to receiving the indicator, holding the first-received ACF at the originating gateway such that a holding occurs of the call setup of the call through the packet switched data network, wherein the indicator indicates that the call is headed to an SS7 network, and wherein the holding of the first-received ACF at the originating gateway is further based on the call being headed to the SS7 network; and implementing the call setup for the call within the packet switched data network via an H.323 protocol, there being no communication path for the call through the packet switched data network prior thereto, wherein the call setup is with a terminating gateway of the packet switched data network, the terminating gateway having a destination Internet Protocol (IP) address that is specified in the first-received ACF.

* * * * *